US012556971B2

(12) United States Patent
Liu et al.

(10) Patent No.: US 12,556,971 B2
(45) Date of Patent: Feb. 17, 2026

(54) ACCESS TO DEDICATED SPECTRUM BASED ON MASTER INFORMATION BLOCK

(71) Applicant: QUALCOMM Incorporated, San Diego, CA (US)

(72) Inventors: Le Liu, San Jose, CA (US); Toni Harri Henrikki Laehteensuo, Helsinki (FI); Alberto Rico Alvarino, San Diego, CA (US); Peter Gaal, San Diego, CA (US); Javier Rodriguez Fernandez, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 18/167,620

(22) Filed: Feb. 10, 2023

(65) Prior Publication Data

US 2024/0276296 A1 Aug. 15, 2024

(51) Int. Cl.
*H04W 28/086* (2023.01)
*H04L 5/00* (2006.01)
*H04W 72/0453* (2023.01)

(52) U.S. Cl.
CPC ....... *H04W 28/0864* (2023.05); *H04L 5/0048* (2013.01); *H04W 72/0453* (2013.01)

(58) Field of Classification Search
None
See application file for complete search history.

(56) References Cited

U.S. PATENT DOCUMENTS

| 2020/0252884 A1* | 8/2020 | Takahashi | H04W 48/20 |
| 2022/0271894 A1* | 8/2022 | Li | H04L 5/0048 |
| 2022/0304014 A1* | 9/2022 | Li | H04L 5/0092 |
| 2023/0031276 A1* | 2/2023 | Kwak | H04W 72/23 |

FOREIGN PATENT DOCUMENTS

| EP | 3609239 A1 * | 2/2020 | .......... H04W 48/16 |
| WO | WO-2025034372 A9 * | 3/2025 | .......... H04L 1/0069 |

* cited by examiner

*Primary Examiner* — Jay P Patel
(74) *Attorney, Agent, or Firm* — Harrity & Harrity, LLP

(57) ABSTRACT

Various aspects of the present disclosure generally relate to wireless communication. In some aspects, a user equipment (UE) may receive a master information block that includes information indicating one or more parameters for communication in a dedicated spectrum for one or more dedicated spectrum UEs. The UE may perform or refrain from performing, based on the master information block and whether the UE is one of the one or more dedicated spectrum UEs, at least part of an initial access procedure for communicating with a network node over the dedicated spectrum. Numerous other aspects are described.

30 Claims, 13 Drawing Sheets

| Index | SSB and CORESET multiplexing pattern | Number of RBs $N_{RB}^{CORESET}$ | Number of symbols $N_{RB}^{CORESET}$ | Offset (RBs) | Interleaving pattern | SSB offset |
|---|---|---|---|---|---|---|
| 0 | 1 | 15 | 2 | 0 | Non-interleaving | 0 |
| 1 | 1 | 15 | 2 | 2 | Non-interleaving | 0 |
| 2 | 1 | 15 | 2 | 4 | Non-interleaving | 0 |
| 3 | 1 | 15 | 3 | 0 | Non-interleaving | 0 |
| 4 | 1 | 15 | 3 | 2 | Non-interleaving | 0 |
| 5 | 1 | 15 | 3 | 4 | Non-interleaving | 0 |
| 6 | 1 | 20 | 2 | 0 | Non-interleaving | 0 |
| 7 | 1 | 20 | 2 | 2 | Non-interleaving | 0 |
| 8 | 1 | 20 | 2 | 4 | Non-interleaving | 0 |
| 9 | 1 | 20 | 3 | 0 | Non-interleaving | 0 |
| 10 | 1 | 20 | 3 | 2 | Non-interleaving | 0 |
| 11 | 1 | 20 | 3 | 4 | Non-interleaving | 0 |
| 12-15 | reserved | | | | | |

Indices 0–5: For 3MHz. Indices 6–11: For 5MHz.

FIG. 6

| Index | SSB and CORESET multiplexing pattern | Number of RBs $N_{RB}^{CORESET}$ | Number of symbols $N_{RB}^{CORESET}$ | Offset (RBs) | Interleaving pattern |
|---|---|---|---|---|---|
| 0 | 1 | 15 | 2 | 0 | Non-interleaving |
| 1 | 1 | 15 | 2 | 2 | Non-interleaving |
| 2 | 1 | 15 | 2 | 4 | Non-interleaving |
| 3 | 1 | 15 | 3 | 0 | Non-interleaving |
| 4 | 1 | 15 | 3 | 2 | Non-interleaving |
| 5 | 1 | 15 | 3 | 4 | Non-interleaving |
| 6 | 1 | 20 | 2 | 0 | Non-interleaving |
| 7 | 1 | 20 | 2 | 2 | Non-interleaving |
| 8 | 1 | 20 | 2 | 4 | Non-interleaving |
| 9 | 1 | 20 | 3 | 0 | Non-interleaving |
| 10 | 1 | 20 | 3 | 2 | Non-interleaving |
| 11 | 1 | 20 | 3 | 4 | Non-interleaving |
| 12-23 | reserved | | | | |

Rows 0-5: For 3MHz; Rows 6-11: For 5MHz

FIG. 8

| PBCH Payload | Quantity of Bits |
|---|---|
| SFN | 10 |
| Half-frame indicator | 1 |
| SSB idx | 0 |
| SSB subcarrier offset (k_SSB) | 5 |
| RMSI config | 8 |
| Front loaded DRMS | 1 |
| Cell barring | 1 |
| Cell reselection | 1 |
| Number of RBs of miniBW | 1 |
| Reserved | 4 |
| CRC | 24 |
| Total: | 56 |

FIG. 9

ACCESS TO DEDICATED SPECTRUM BASED ON MASTER INFORMATION BLOCK

FIELD OF THE DISCLOSURE

Aspects of the present disclosure generally relate to wireless communication and to techniques and apparatuses for access to a dedicated spectrum based on a master information block.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a master information block that includes information indicating one or more parameters for communication in a dedicated spectrum for one or more dedicated spectrum UEs. The method may include performing or refraining from performing, based on the master information block and whether the UE is one of the one or more dedicated spectrum UEs, at least part of an initial access procedure for communicating with a network node over the dedicated spectrum.

Some aspects described herein relate to a method of wireless communication performed by a network node. The method may include outputting a master information block that includes information indicating one or more parameters for communication in a dedicated spectrum for one or more dedicated spectrum UEs. The method may include performing or refraining from performing, with a UE and based on the master information block and whether the UE is one of the one or more dedicated spectrum UEs, at least part of an initial access procedure for communicating with the network node over the dedicated spectrum.

Some aspects described herein relate to a UE for wireless communication. The UE may include a memory and one or more processors coupled to the memory. The one or more processors may be configured to receive a master information block that includes information indicating one or more parameters for communication in a dedicated spectrum for one or more dedicated spectrum UEs. The one or more processors may be configured to perform or refrain from performing, based on the master information block and whether the UE is one of the one or more dedicated spectrum UEs, at least part of an initial access procedure for communicating with a network node over the dedicated spectrum.

Some aspects described herein relate to a network node for wireless communication. The network node may include a memory and one or more processors coupled to the memory. The one or more processors may be configured to output a master information block that includes information indicating one or more parameters for communication in a dedicated spectrum for one or more dedicated spectrum UEs. The one or more processors may be configured to perform or refrain from performing, with a UE and based on the master information block and whether the UE is one of the one or more dedicated spectrum UEs, at least part of an initial access procedure for communicating with the network node over the dedicated spectrum.

Some aspects described herein relate to a non-transitory computer-readable medium that stores a set of instructions for wireless communication by a UE. The set of instructions, when executed by one or more processors of the UE, may cause the UE to receive a master information block that includes information indicating one or more parameters for communication in a dedicated spectrum for one or more dedicated spectrum UEs. The set of instructions, when executed by one or more processors of the UE, may cause the UE to perform or refrain from performing, based on the master information block and whether the UE is one of the one or more dedicated spectrum UEs, at least part of an initial access procedure for communicating with a network node over the dedicated spectrum.

Some aspects described herein relate to a non-transitory computer-readable medium that stores a set of instructions for wireless communication by a network node. The set of instructions, when executed by one or more processors of the network node, may cause the network node to output a master information block that includes information indicating one or more parameters for communication in a dedicated spectrum for one or more dedicated spectrum UEs.

The set of instructions, when executed by one or more processors of the network node, may cause the network node to perform or refrain from performing, with a UE and based on the master information block and whether the UE is one of the one or more dedicated spectrum UEs, at least part of an initial access procedure for communicating with the network node over the dedicated spectrum.

Some aspects described herein relate to an apparatus for wireless communication. The apparatus may include means for receiving a master information block that includes information indicating one or more parameters for communication in a dedicated spectrum for one or more dedicated spectrum apparatuses. The apparatus may include means for performing or refraining from performing, based on the master information block and whether the apparatus is one of the one or more dedicated spectrum apparatuses, at least part of an initial access procedure for communicating with a network node over the dedicated spectrum.

Some aspects described herein relate to an apparatus for wireless communication. The apparatus may include means for outputting a master information block that includes information indicating one or more parameters for communication in a dedicated spectrum for one or more dedicated spectrum UEs. The apparatus may include means for performing or refraining from performing, with a UE and based on the master information block and whether the UE is one of the one or more dedicated spectrum UEs, at least part of an initial access procedure for communicating with the network node over the dedicated spectrum.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 illustrates an example of a table that indexes one or more parameters for communication in a dedicated spectrum based on a value of a remaining minimum system information (RMSI) configuration field of an MIB, in accordance with the present disclosure.

FIG. 8 illustrates an example of a table that indexes one or more parameters for communication in a dedicated spectrum based on a value of a synchronization signal block (SSB) subcarrier offset field of the MIB, in accordance with the present disclosure.

FIG. 9 illustrates an example of a table that summarizes parameters carried in a physical broadcast channel (PBCH) payload of an SSB, in accordance with the present disclosure.

DETAILED DESCRIPTION

Figure 1:
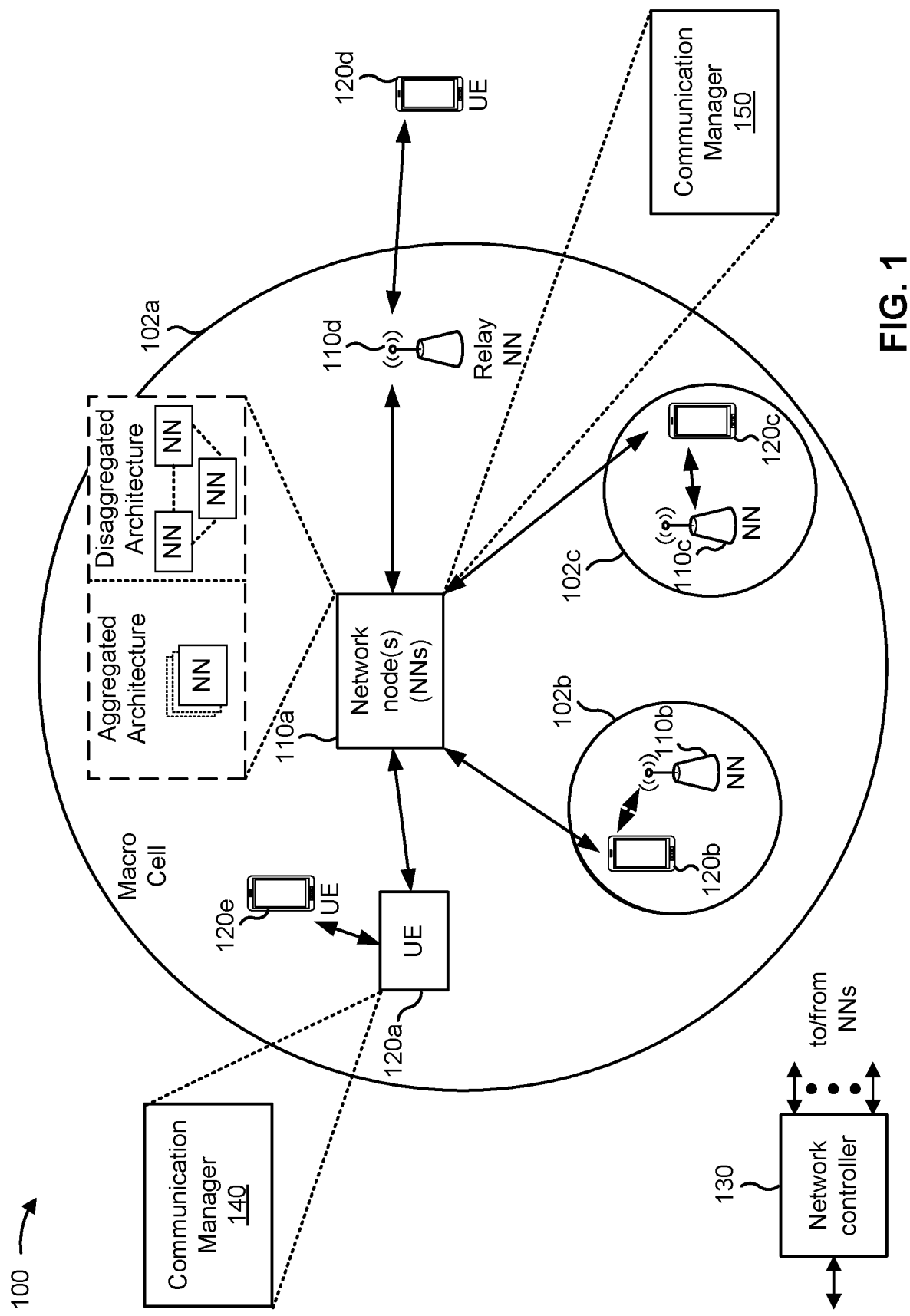
FIG. 1 is a diagram illustrating an example of a wireless network, in accordance with the present disclosure.

Certain frequency spectra, such as 5G bands, may be dedicated for specific uses. For example, a government agency may dedicate one or more frequency spectra for utilities, such as rail communication. Once a spectrum has been dedicated, only a subset of user equipments (UEs) may be permitted to communicate over that spectrum. UEs that are permitted to communicate over a dedicated spectrum may be referred to herein as "dedicated spectrum UEs." UEs that are unable to communicate over a dedicated spectrum (e.g., due to insufficient hardware, software, or other requirements for communicating over the dedicated spectrum), or UEs that are prohibited from communicating over a dedicated spectrum, may be referred to herein as "legacy UEs."

When a legacy UE receives a master information block (MIB) for a dedicated spectrum (e.g., an MIB including parameters for accessing dedicated spectrum) from a base station (BS), the legacy UE may spend resources (e.g., time, power, bandwidth, or the like) performing at least part of an initial access procedure with the BS. For example, the legacy UE may perform a blind search of the control resource set (CORESET) search space for scheduling information for a system information block 1 (SIB1) transmission from the BS. If the legacy UE detects the SIB1 transmission according to the scheduling information, the legacy UE may transmit, to the network node, one or more physical random access channel (PRACH) transmissions, which may interfere with or use resources for transmissions to or from dedicated spectrum UEs that are operating within the dedicated spectrum. The BS may deny the legacy UE access to the dedicated spectrum only after the legacy UE has spent resources performing the initial access procedure operations described above.

Moreover, when a dedicated spectrum UE receives an MIB for a dedicated spectrum from a BS, the dedicated spectrum UE may spend resources (e.g., time and power resources) blindly detecting different minimum bandwidths in the dedicated spectrum. By way of example, the dedicated spectrum may include a communication bandwidth of less than or equal to 5 MHz (e.g., the bandwidth part (BWP) may be 5 MHz and have 20 resource blocks (RBs)) and a communication bandwidth that is less than or equal to 3 MHZ (e.g., the BWP may be 3 MHz and have 15 or 16 RBs). The dedicated spectrum UE may, for instance, perform at least part of an initial access procedure for both the BWP of 5 MHz and the BWP of 3 MHZ.

Some techniques described herein may enable a UE to perform or refrain from performing at least part of an initial access procedure for communicating with a network node (e.g., a BS) over a dedicated spectrum. In some examples, the network node may output an MIB that includes information indicating one or more parameters for communication in a dedicated spectrum for one or more dedicated spectrum UEs. If the UE is a legacy UE, then the legacy UE may refrain from performing at least part of the initial access procedure. If the UE is a dedicated spectrum UE, then the dedicated spectrum UE may perform at least part of the initial access procedure.

In either case (legacy UE or dedicated spectrum UE), the UE may conserve battery power, processing resources, time, bandwidth, or the like. In the case of a legacy UE, the legacy UE may refrain from performing a blind search of the CORESET search space and from transmitting any PRACH transmissions associated with the dedicated spectrum. In the case of a dedicated spectrum UE, the dedicated spectrum UE may determine the minimum bandwidth of the dedicated spectrum based on the information in the MIB, thereby avoiding blind detection of different minimum bandwidths in the dedicated spectrum.

In some aspects, the information in the MIB may include (1) an indication of whether to perform or to refrain from performing at least part of the initial access procedure (e.g., one of a value of a $k_{SSB}$ field or a value of a remaining minimum system information (RMSI) configuration field), and (2) an indication of the one or more parameters (e.g., the other of the value of the $k_{SSB}$ field or the value of the RMSI configuration field). Because the UE may receive the MIB before completing the initial access procedure, the UE may proceed, or refrain from proceeding, with the initial access procedure (e.g., depending on whether the UE is a dedicated spectrum UE or a legacy UE) based on the information in the MIB.

In some aspects, the network node may broadcast the MIB via one or more resource elements (REs) allocated for reception of the MIB by dedicated spectrum UEs. In such instances, the dedicated spectrum UEs may receive the MIB and the legacy UEs may not receive the MIB (e.g., based on whether a PBCH cyclic redundancy check (CRC) operation is successful). As a result, the dedicated spectrum UEs may proceed with at least part of the initial access procedure efficiently (e.g., based on the information in the MIB), and the legacy UEs may avoid the initial access procedure entirely.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a master information block that includes information indicating one or more parameters for communication in a dedicated spectrum for one or more dedicated spectrum UEs; and perform or refrain from performing, based on the master information block and whether the UE is one of the one or more dedicated spectrum UEs, at least part of an initial access procedure for communicating with a network node over the dedicated spectrum. Additionally, or alternatively, the communication manager 140 may perform one or more other operations described herein.

In some aspects, the network node 110 may include a communication manager 150. As described in more detail elsewhere herein, the communication manager 150 may output a master information block that includes information indicating one or more parameters for communication in a dedicated spectrum for one or more dedicated spectrum UEs; and perform or refrain from performing, with a UE and based on the master information block and whether the UE is one of the one or more dedicated spectrum UEs, at least part of an initial access procedure for communicating with the network node over the dedicated spectrum. Additionally, or alternatively, the communication manager 150 may perform one or more other operations described herein.

As indicated above, FIG. 1 is provided as an example. Other examples may differ from what is described with regard to FIG. 1.

Figure 2:
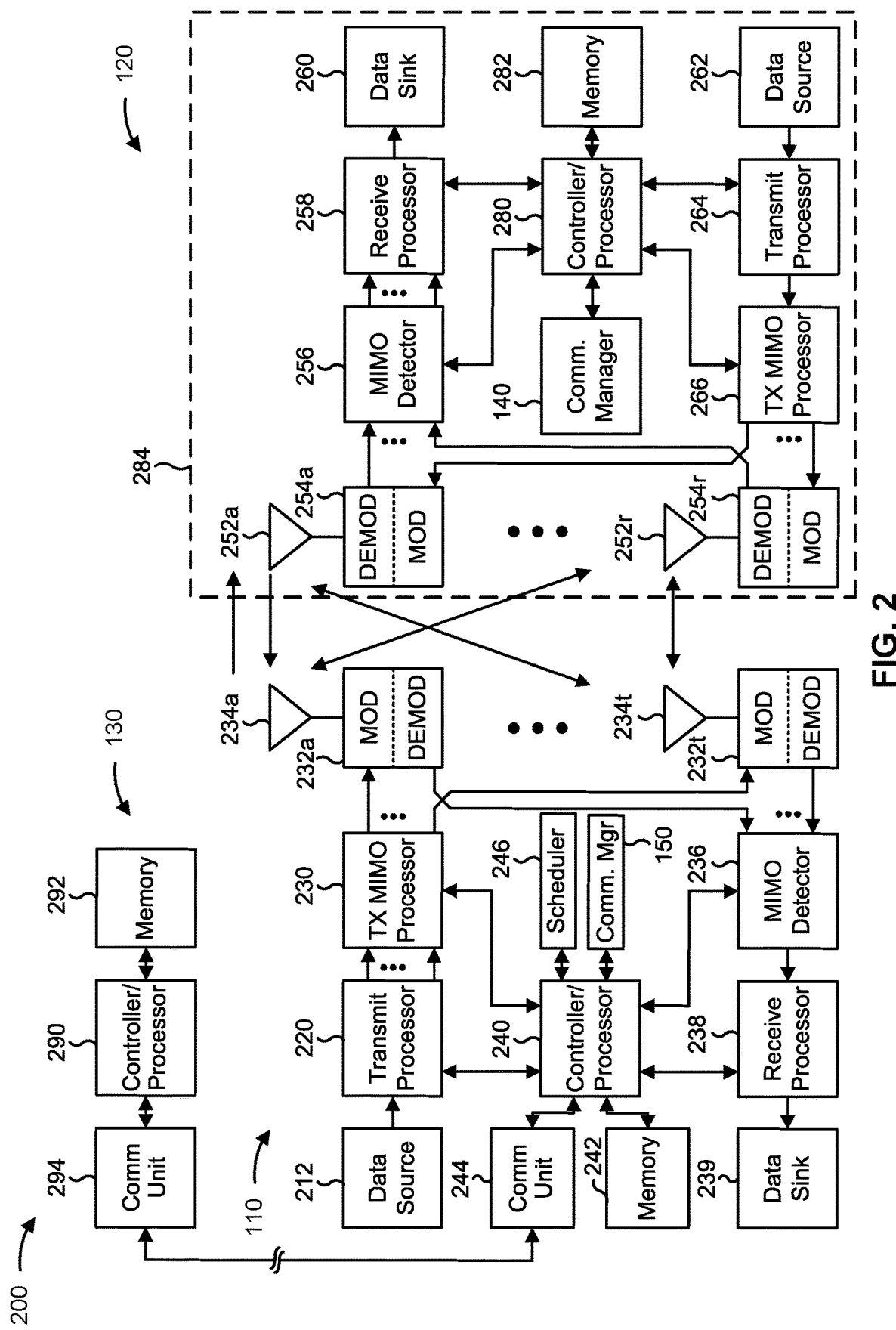
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the network node 110, the controller/processor 280 of the UE 120, and/or any other component(s) of FIG. 2 may perform one or more techniques associated with access to a dedicated spectrum based on a master information block, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving a master information block that includes information indicating one or more parameters for communication in a dedicated spectrum for one or more dedicated spectrum UEs; and/or means for performing or refraining from performing, based on the master information block and whether the UE 120 is one of the one or more dedicated spectrum UEs, at least part of an initial access procedure for communicating with a network node over the dedicated spectrum. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for outputting a master information block that includes information indicating one or more parameters for communication in a dedicated spectrum for one or more dedicated spectrum UEs; and/or means for performing or refraining from performing, with a UE and based on the master information block and whether the UE is one of the one or more dedicated spectrum UEs, at least part of an initial access procedure for communicating with the network node over the dedicated spectrum. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
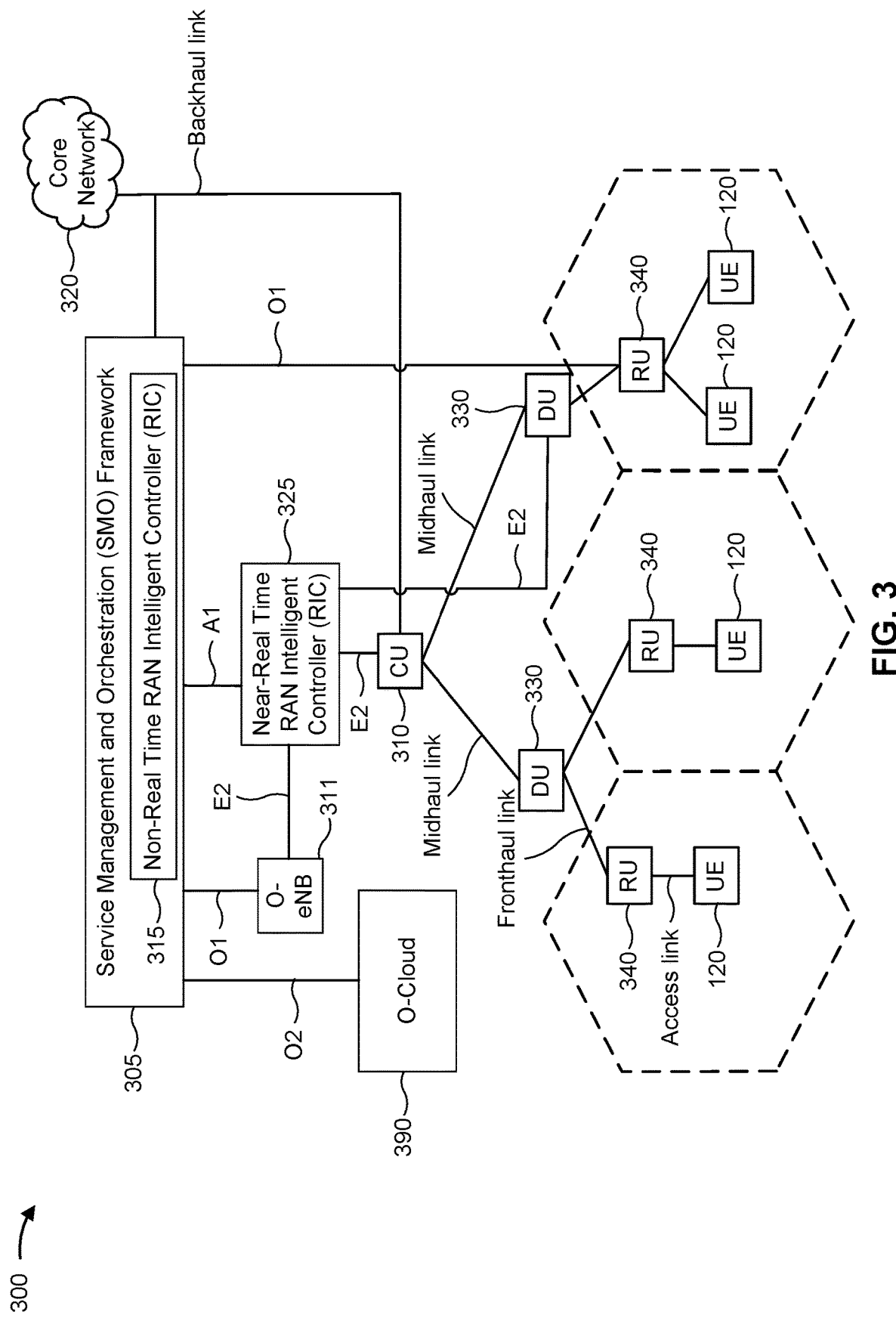
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
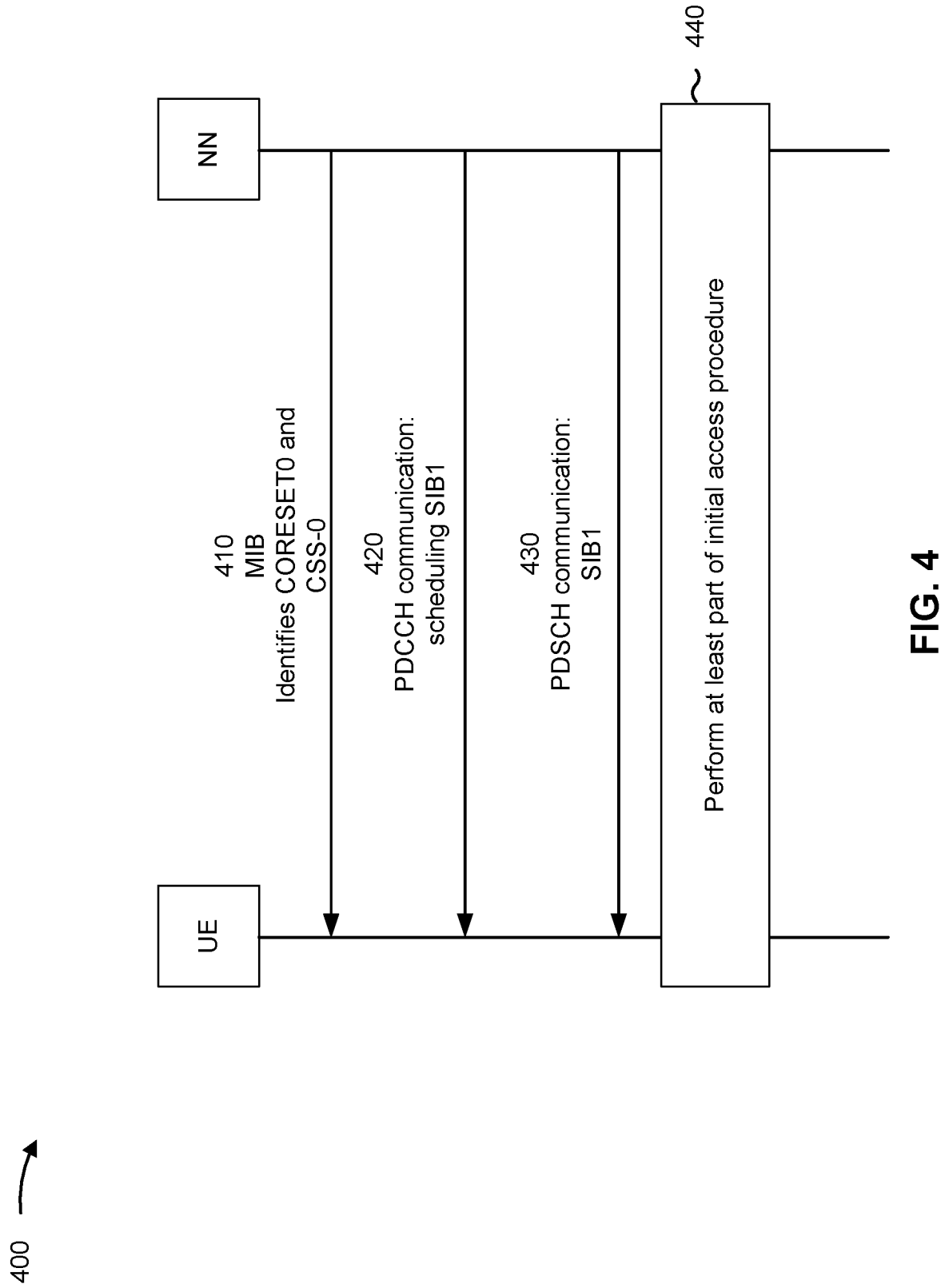
FIG. 4 is a diagram illustrating an example of an initial access procedure, in accordance with the present disclosure.

FIG. 4 is a diagram illustrating an example 400 of an initial access procedure, in accordance with the present disclosure. In some examples, the initial access procedure may be a procedure by which the UE synchronizes with, and obtains at least an initial uplink grant from, the network node. In some aspects, the initial access procedure may establish or facilitate the establishment of a connection between the UE and the network node, such that the UE is connected to the wireless network via the network node. The UE may be referred to as performing "at least part of" the initial access procedure, meaning that the UE may perform one or more steps of the initial access procedure that are described as being performed by the UE. The network node may be referred to as performing "at least part of" the initial access procedure, meaning that the network node may perform one or more steps of the initial access procedure that are described as being performed by the network node.

As shown in FIG. 4, example 400 includes communication between a UE and a network node (NN). In some aspects, the UE and the network node may be included in a wireless network, such as wireless network 100. The UE and the network node may communicate via a wireless access link, which may include an uplink and a downlink.

As shown in FIG. 4, and by reference number 410, the network node may output, and the UE may receive, an MIB. In some examples, the MIB may be carried in a synchronization signal/physical broadcast channel (PBCH) block (also referred to as a synchronization signal block (SSB)). The MIB may identify parameters for the UE to complete the initial access procedure. For example, the MIB may identify a CORESET carrying a physical downlink control channel (PDCCH) transmission and a Type-0 PDCCH common search space (CSS) for the CORESET. The CORESET may be referred to as CORESET0, and the CSS may be referred to as CSS-0. The CORESET0 may be a defined set of time resources (e.g., OFDM symbols) and frequency resources (e.g., RBs). The CSS-0 may be a subset of the time and frequency resources in the CORESET0. In some examples, the UE may perform a blind search in the CSS-0 for a specific PDCCH transmission (e.g., scheduling information for an SIB1 transmission).

As shown in FIG. 4, and by reference number 420, the network node may output, and the UE may receive, a PDCCH communication that contains scheduling information for an SIB1 transmission. The UE may perform blind decoding of PDCCH candidates in the CSS-0 to identify the PDCCH communication. The PDCCH communication may be or include downlink control information (DCI), in the PDCCH, that schedules the SIB1 transmission in the physical downlink shared channel (PDSCH). For example, the DCI may be or include the scheduling information.

As shown in FIG. 4, and by reference number 430, the network node may output, and the UE may receive, a PDSCH communication that contains an SIB1 transmission that was scheduled by the PDCCH communication. The SIB1 transmission may provide information for the UE to access a cell of the network node. In some examples, the SIB1 transmission may include scheduling information for further transmissions (e.g., transmissions of remaining system information blocks (SIBs)) involved in additional operations of the initial access procedure. In some examples, the SIB1 transmission may include an indication of a PRACH configuration for subsequent uplink PRACH transmissions by which the UE may request additional SIBs from the network node. The PRACH configuration may indicate, for example, a set of random access channel (RACH) preambles, a set of RACH occasions on which to transmit a selected RACH preamble of the RACH preambles, or other information relating to performing random access.

As shown in FIG. 4, and by reference number 440, the network node and the UE may perform at least part of the initial access procedure. For example, the network node and the UE may continue (e.g., complete) the initial access procedure by exchanging further transmissions (e.g., PRACH transmissions, additional SIB transmissions, or the like). Once the initial access procedure is complete, the UE may transmit uplink data to the network node based on one or more uplink grants provided by the network node. In some aspects, the initial access procedure may establish or facilitate the establishment of a connection between the UE and the network node, such that the UE is connected to the wireless network via the network node.

As indicated above, FIG. 4 is provided as an example. Other examples may differ from what is described with regard to FIG. 4.

If the UE is a legacy UE (e.g., a UE that is unable to communicate, or is prohibited from communicating, over a dedicated spectrum), and the legacy UE receives from the network node an MIB for the dedicated spectrum, then the legacy UE may spend resources (e.g., time, power, bandwidth, or the like) performing at least part of an initial access procedure with the network node. For example, the legacy UE may perform a blind search of the CSS-0 for scheduling information for an SIB1 transmission from the network node. If the legacy UE detects the SIB1 transmission according to the scheduling information, the legacy UE may transmit one or more PRACH transmissions (e.g., PRACH transmissions to request additional SIBs) over the dedicated spectrum. The PRACH transmissions may interfere with transmissions to or from dedicated spectrum UEs that are operating within the dedicated spectrum. The network node may deny the legacy UE access to the dedicated spectrum only after the legacy UE has spent resources performing the initial access procedure operations described above.

Moreover, if the UE is a dedicated spectrum UE (e.g., a UE that is permitted to communicate over a dedicated spectrum), and the dedicated spectrum UE receives from the network node an MIB for a dedicated spectrum, then the dedicated spectrum UE may spend resources (e.g., time and power) blindly detecting different minimum bandwidths in the dedicated spectrum. By way of example, the dedicated spectrum may include a communication bandwidth of less than or equal to 5 MHZ (e.g., the BWP may be 5 MHz and have 20 RBs) and a communication bandwidth that is less than or equal to 3 MHz (e.g., the BWP may be 3 MHz and have 16 RBs). The dedicated spectrum UE may, for instance, perform at least part of an initial access procedure for both the BWP of 5 MHz and the BWP of 3 MHz.

Some techniques described herein enable a UE to perform or refrain from performing at least part of an initial access procedure for communicating with a network node over a dedicated spectrum. In some examples, the network node may output an MIB that includes information indicating one or more parameters for communication in a dedicated spectrum for one or more dedicated spectrum UEs. If the UE is a legacy UE, then the legacy UE may refrain from performing at least part of the initial access procedure. If the UE is a dedicated spectrum UE, then the dedicated spectrum UE may perform at least part of the initial access procedure.

In either case (legacy UE or dedicated spectrum UE), the UE conserves battery power, processing resources, time, bandwidth, or the like. In the case of a legacy UE, the legacy UE may refrain from performing a blind search of the CSS-0 and from transmitting any PRACH transmissions associated with the dedicated spectrum. In the case of a dedicated spectrum UE, the dedicated spectrum UE may determine the minimum bandwidth of the dedicated spectrum based on the information in the MIB, thereby avoiding blind detection of different minimum bandwidths in the dedicated spectrum.

Figure 5:
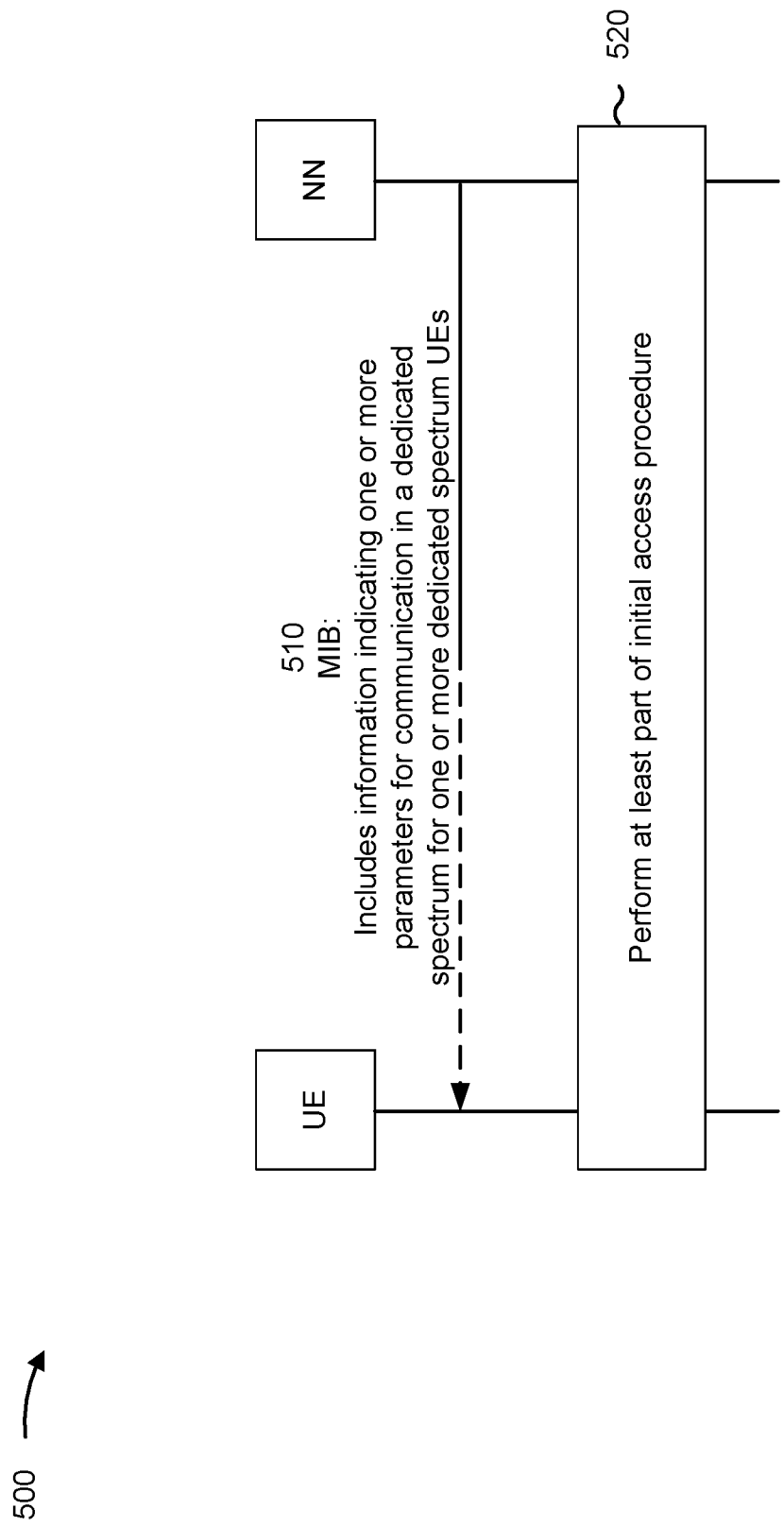
FIG. 5 is a diagram illustrating an example associated with controlling access to a dedicated spectrum using a master information block (MIB), in accordance with the present disclosure.

FIG. 5 is a diagram illustrating an example 500 associated with controlling access to a dedicated spectrum using an MIB, in accordance with the present disclosure. As shown in FIG. 5, example 500 includes communication between a UE and a network node (NN). In some aspects, the UE and network node may be included in a wireless network, such as wireless network 100. The UE and network node may communicate via a wireless access link, which may include an uplink and a downlink. The UE may be a legacy UE or a dedicated spectrum UE.

As shown in FIG. 5, and by reference number 510, the network node may output an MIB that includes information indicating one or more parameters for communication in a dedicated spectrum for one or more dedicated spectrum UEs. The MIB shown in FIG. 5 may be modified compared to the MIB shown in FIG. 4 (e.g., the MIB shown in FIG. 5 may include additional or different information than the MIB shown in FIG. 4). The dedicated spectrum may have a communication bandwidth in which a dedicated spectrum UE may exchange transmissions with the network node. For example, the communication bandwidth of the dedicated spectrum may be less than 5 MHz. For example, the communication bandwidth may be less than or equal to 3 MHz.

As shown in FIG. 5, and by reference number 520, the network node and the UE may perform or refrain from performing, based on the MIB and whether the UE is one of the one or more dedicated spectrum UEs, at least part of an initial access procedure for communicating with the network node over the dedicated spectrum. In some examples, if the UE is not one of the one or more dedicated spectrum UEs (e.g., if the UE is a legacy UE), then the UE and network node may refrain from performing the at least part of the initial access procedure (e.g., respective parts of the initial access procedure performed by the UE or the network node). In some examples, if the UE is one of the one or more dedicated spectrum UEs, then the UE and network node may perform the at least part of the initial access procedure (e.g., respective parts of the initial access procedure performed by the UE or the network node). The at least part of the initial access procedure may be a remaining portion of the initial access procedure that occurs after the network node outputs (e.g., broadcasts) the MIB. For example, the at least part of the initial access procedure may involve the network node outputting, and the UE receiving, SIBs, one or more uplink grants, or the like.

Performing or refraining from performing the at least part of the initial access procedure based on the MIB may enable the UE to conserve battery power, processing resources, time, bandwidth, or the like. For example, if the UE is a legacy UE, the legacy UE may refrain from performing a blind search of the CSS-0 and from transmitting any PRACH transmissions associated with the dedicated spectrum. In the case of a dedicated spectrum UE, the dedicated spectrum UE may determine the minimum bandwidth of the dedicated spectrum based on the information in the MIB, thereby avoiding blind detection of different minimum bandwidths in the dedicated spectrum.

In some aspects, as discussed in greater detail below in connection with FIGS. 6-8, the information in the MIB may include a first indication and a second indication. The first indication may indicate whether to perform or to refrain from performing the at least part of the initial access procedure. The second indication may indicate the one or more parameters for communication in a dedicated spectrum for one or more dedicated spectrum UEs. In some examples, the UE may receive the MIB and perform or refrain from performing the initial access procedure based on the first indication and the second indication. Because the UE may receive the MIB before completing the initial access procedure, the UE may proceed, or refrain from proceeding, with the at least part of the initial access procedure based on the first and second indications in the MIB.

In some aspects, as discussed in greater detail below in connection with FIG. 9, the network node may output (e.g., broadcast) the MIB via one or more REs allocated for reception of the MIB by the one or more dedicated spectrum UEs (e.g., the one or more REs may be allocated by a network node or in a wireless communication specification, and may be allocated for reception of the MIB by one or more dedicated spectrum UEs). In such instances, the dedicated spectrum UEs may receive the MIB and the legacy UEs may not receive the MIB. For example, dedicated spectrum UEs may be configured or signaled to receive the MIB at the REs allocated for reception of the MIB, and therefore may receive the MIB. On the other hand, legacy UEs may not be configured to receive the MIB at such REs, and therefore may not receive the MIB. As a result, the dedicated spectrum UEs may proceed with at least part of the initial access procedure efficiently (e.g., based on the information in the MIB), and the legacy UEs may avoid the initial access procedure entirely.

As indicated above, FIG. 5 is provided as an example. Other examples may differ from what is described with respect to FIG. 5.

In some aspects, the information in the MIB may include a first indication (e.g., an indication of whether to perform or to refrain from performing the at least part of the initial access procedure) and a second indication (e.g., an indication of the one or more parameters). In some examples, the first indication is a value of an SSB subcarrier offset field (e.g., a $k_{SSB}$ field) of the MIB and the second indication is a value of the RMSI configuration field of the MIB.

In some instances, a $k_{SSB}$ field may indicate an offset from a lowest subcarrier of a common resource to a lowest subcarrier of an SSB associated with (e.g., an SSB that carries) the MIB. A $k_{SSB}$ field may include five bits: the four most significant bits of the ssb-SubcarrierOffset parameter in the MIB and the least significant bit in the payload of the SSB. In some instances, an RMSI configuration field (which may also be referred to as a pdcch-ConfigSIB1 field) may indicate a configuration of the CORESET0 and a configuration of the CSS-0. The RMSI configuration field may include eight bits: the four most significant bits may represent an index that corresponds to the CORESET0, and the four least significant bits may represent an index that corresponds to the CSS-0.

In some examples, the value of the SSB subcarrier offset field (e.g., a $k_{SSB}$ field) of the MIB may indicate that the one or more parameters are to be identified by reference to a table. The table may index values of the one or more parameters based on the value of the RMSI configuration field of the MIB. In some examples, the value of the SSB subcarrier offset field may be set to a particular value (e.g., 30) indicating that the MIB is for a dedicated spectrum UE (e.g., indicating whether to perform or refrain from performing at least part of the initial access procedure). In some aspects, the value may be a value that a legacy UE interprets as being reserved or unused.

Upon receiving the MIB, a legacy UE may identify the value of the SSB subcarrier offset field and, based on the value of the SSB subcarrier offset field, perform a look-up in a table. The table may indicate how SSB subcarrier offset field values are mapped to offsets from a lowest subcarrier of a common resource to a lowest subcarrier of an SSB associated with (e.g., an SSB that carries) the MIB, and may include a reserved value or unused value for the SSB subcarrier offset field. Based on the table and the value of the SSB subcarrier offset field (e.g., based on the value being mapped to the value that the legacy UE interprets as being reserved or unused), the legacy UE may determine that there is no CORESET0 that applies to the legacy UE and refrain from performing at least part of an initial access procedure. For example, the legacy UE may refrain from continuing further with the initial access procedure. For example, the legacy UE may refrain from performing a blind search for an SIB1 transmission.

When the MIB is received by a dedicated spectrum UE, the dedicated spectrum UE may identify the value of the SSB subcarrier offset field and the value of the RMSI configuration field. In response to identifying the value of the SSB subcarrier offset field, the dedicated spectrum UE may perform a look-up for the one or more parameters in a table. The table may indicate how SSB subcarrier offset field values are mapped to offsets from a lowest subcarrier of a common resource to a lowest subcarrier of an SSB associated with (e.g., an SSB that carries) the MIB, and may include, for the value of the SSB subcarrier offset field indicated by the MIB for the dedicated spectrum UE, an indication to perform the initial access procedure and/or identify the one or more parameters. In response to performing the look-up, the dedicated spectrum UE may identify the one or more parameters in the table and perform at least part of an initial access procedure. For example, the dedicated spectrum UE may complete the initial access procedure without performing blind searching of different minimum bandwidths in the dedicated spectrum.

FIG. 6 illustrates an example of a table 600 that indexes one or more parameters for communication in a dedicated spectrum based on a value of an RMSI configuration field of the MIB, in accordance with the present disclosure. A dedicated spectrum UE may perform a look-up in the table 600 in response to receiving an MIB that contains an indication of whether to perform or to refrain from performing at least part of an initial access procedure (e.g., a value of an SSB subcarrier offset field) and an indication of the one or more parameters (e.g., an RMSI configuration field).

The table 600 may map the four most significant bits of the RMSI configuration field to the CORESET0 configuration and to an SSB offset if configurable for the target dedicated spectrum frequency bands. The table 600 may identify a set of RBs and slot symbols of CORESET0 for CSS-0 when the subcarrier spacings (SCSs) for both the SSB and PDCCH are 15 kHz for frequency bands with minimum channel bandwidths of 5 MHz or 3 MHz.

As shown, the table 600 includes index values 0-15. Index values 0-5 may correspond to a dedicated spectrum that includes a communication bandwidth that is less than or equal to 3 MHz (e.g., 3 MHz). Index values 6-11 may correspond to a dedicated spectrum that includes a communication bandwidth of less than or equal to 5 MHz. Index values 12-15 may be reserved.

The table 600 may include, for each index value, an indication of the CORESET configuration. The CORESET configuration may include one or more of: an indication of a multiplexing pattern for communication in a dedicated spectrum ("SSB and CORESET multiplexing pattern"); an indication of a quantity of RBs for communication in a dedicated spectrum ("Number of RBs"); an indication of a quantity of symbols for communication in a dedicated spectrum ("Number of symbols"); an indication of an offset of an SSB and/or a CORESET (e.g., CORESET0) for communication in a dedicated spectrum ("Offset"); or an indication of one or more of whether or not an interleaving pattern is associated with the communication in the dedicated spectrum or of a type of the interleaving pattern ("Interleaving pattern").

The table 600 may further include, for each index value, an indication of an offset from a lowest subcarrier of a common resource block to a lowest subcarrier of an SSB associated with the MIB ("SSB offset"). In some examples, the SSB offset may be configurable for the target dedicated spectrum frequency band(s). In some examples, the SSB offset may be predefined as 0 and therefore absent from the table 600. Predefining the SSB offset as 0 may reduce complexity, whereas identifying the SSB offset for each index value may improve flexibility.

The values contained in the table 600 shown in FIG. 6 are provided merely as examples. The table 600 may contain any suitable values in accordance with techniques described herein. The table 600 may not be constrained to the example values shown in FIG. 6.

As indicated above, FIG. 6 is provided as an example. Other examples may differ from what is described with respect to FIG. 6.

Figure 7:
FIG. 7 illustrates an example of a table with entries pertaining to dedicated spectrum and entries pertaining to non-dedicated spectrum, in accordance with the present disclosure.

FIG. 7 illustrates an example of a table 700 with entries pertaining to dedicated spectrum (referred to as non-legacy entries) and entries pertaining to non-dedicated spectrum (referred to as legacy entries), in accordance with the present disclosure. The table 700 may index, in the non-legacy entries, one or more parameters for communication in a dedicated spectrum based on a value of an RMSI configuration field of the MIB. A dedicated spectrum UE may perform a look-up in the non-legacy entries of the table 700 in response to receiving an MIB that contains an indication of whether to perform or to refrain from performing at least part of an initial access procedure (e.g., a value of an SSB subcarrier offset field) and an indication of the one or more parameters (e.g., an RMSI configuration field).

The table 700 may map the four most significant bits of the RMSI configuration field to the CORESET0 configuration for the target dedicated spectrum frequency bands. The table 700 may identify a set of RBs and slot symbols of CORESET0 for CSS-0 when the SCSs for both the SSB and PDCCH are 15 kHz for frequency bands operated with shared spectrum channel access or for the frequency bands with minimum channel bandwidths of 5 MHz or 3 MHz.

As shown, the table 700 includes index values 0-15. Index values 0-7 may correspond to legacy entries. Index values 8 and 9 may correspond to a dedicated spectrum that includes a communication bandwidth that is less than or equal to 3 MHz (e.g., 3 MHz). Index values 10 and 11 may correspond to a dedicated spectrum that includes a communication bandwidth of less than 5 MHz. Index values 12-15 may be reserved.

The table 700 may include, for each index value, an indication of the CORESET configuration. The CORESET configuration may include one or more of: an indication of a multiplexing pattern for communication in a dedicated spectrum ("SSB and CORESET multiplexing pattern"); an indication of a quantity of RBs for communication in a dedicated spectrum ("Number of RBs"); an indication of a quantity of symbols for communication in a dedicated spectrum ("Number of symbols"); or an indication of an offset of an SSB and/or a CORESET (e.g., CORESET0) for communication in a dedicated spectrum ("Offset").

In table 700, an indication of one or more of an interleaving pattern and an indication of the SSB offset for index values 8-11 may be predefined as "non-interleaved" and "0," respectively. As a result, the indications of the interleaving pattern and SSB offset are absent from the table 700. In other examples, the table 700 may include non-legacy columns that permit identification of one or more of the interleaving pattern and the SSB offset for one or more of index values 8-11.

The values contained in the table 700 are provided merely as examples. The table 700 may contain any suitable values in accordance with techniques described herein. The table 700 may not be constrained to the example values shown in FIG. 7.

As indicated above, FIG. 7 is provided as an example. Other examples may differ from what is described with respect to FIG. 7.

In some aspects, as noted, the information in the MIB may include a first indication (e.g., an indication of whether to perform or to refrain from performing the at least part of the initial access procedure) and a second indication (e.g., an indication of the one or more parameters). In some examples, the first indication is a value of the RMSI configuration field of the MIB and the second indication is a value of an SSB subcarrier offset field (e.g., a $k_{SSB}$ field) of the MIB. It should be understood that, in some examples herein, the SSB subcarrier offset field can indicate one or more parameters other than (and/or including) an SSB subcarrier offset. "SSB subcarrier offset field" is used for ease of reference to this field, rather than to indicate the exact parameters indicated by the field.

In some examples, the value of the RMSI configuration field of the MIB may indicate that the one or more parameters are to be identified by reference to a table. The table may index values of the one or more parameters based on the value of the SSB subcarrier offset field (e.g., a $k_{SSB}$ field) of the MIB. In some examples, the value of the RMSI configuration field may be set to a value that is considered reserved or unused by legacy UEs (e.g., 15). The SSB subcarrier offset field may be set to a value that is less than 23.

Upon receiving the MIB, a legacy UE may identify the value of the SSB subcarrier offset field and, based on the value of the SSB subcarrier offset field, perform a look-up in a table. The table may indicate how a CORESET index specified in an RMSI configuration field maps to a configuration of a CORESET0, and may include one or more reserved values or unused values for the RMSI configuration field. The legacy UE may determine that there is no CORESET0 that applies to the CORESET index specified in the RMSI configuration field (e.g., 15). As a result, the legacy UE may refrain from performing at least part of an initial access procedure. For example, the legacy UE may refrain from continuing further with the initial access procedure. For example, the legacy UE may refrain from performing a blind search for an SIB1 transmission.

When the MIB is received by a dedicated spectrum UE, the dedicated spectrum UE may identify the value of the RMSI configuration field and the value of the SSB subcarrier offset field. In response to identifying the value of the SSB subcarrier offset field, the dedicated spectrum UE may perform a look-up for the one or more parameters in a table. The table may indicate how an SSB subcarrier offset field maps to a configuration of a CORESET0. The table may include, for a value of the SSB subcarrier offset field, indicated by the MIB for the dedicated spectrum UE, an indication of the one or more parameters (e.g., based on a look-up according to the value of the SSB subcarrier offset field). For example, the dedicated spectrum UE may perform the look-up in the table based on the value of the SSB subcarrier offset field. By performing the look-up, the dedicated spectrum UE may identify the one or more parameters in the table, which the dedicated spectrum UE may use to perform at least part of an initial access procedure. For example, the dedicated spectrum UE may complete the initial access procedure without performing blind searching of different minimum bandwidths in the dedicated spectrum.

FIG. 8 illustrates an example of a table 800 that indexes one or more parameters for communication in a dedicated spectrum based on a value of the SSB subcarrier offset field of the MIB, in accordance with the present disclosure. A dedicated spectrum UE may perform a look-up in the table 800 in response to receiving an MIB that contains an indication of whether to perform or to refrain from performing at least part of an initial access procedure (e.g., an RMSI configuration field) and an indication of the one or more parameters (e.g., a value of an SSB subcarrier offset field).

The table 800 may map values of an SSB subcarrier offset field to the CORESET0 configuration and to an SSB offset if configurable for the target dedicated spectrum frequency bands. The table 800 may include a mapping of the respective values of the SSB subcarrier offset field to respective sets of RBs and slot symbols of CORESET0 for CSS-0 when the SCSs for both the SSB and PDCCH are 15 kHz for frequency bands with minimum channel bandwidths of 5 MHz or 3 MHz.

As shown, the table 800 includes SSB subcarrier offset field values (e.g., index values) 0-23. SSB subcarrier offset field values 0-5 may correspond to a dedicated spectrum that includes a communication bandwidth that is less than or equal to 3 MHz (e.g., 3 MHz). SSB subcarrier offset field values 6-11 may correspond to a dedicated spectrum that includes a communication bandwidth of less than 5 MHz. SSB subcarrier offset field values 12-23 may be reserved.

The table 800 may include, for each index value, an indication of a CORESET configuration. The CORESET configuration may include one or more of: an indication of a multiplexing pattern for communication in a dedicated spectrum ("SSB and CORESET multiplexing pattern"); an indication of a quantity of RBs for communication in a dedicated spectrum ("Number of RBs"); an indication of a quantity of symbols for communication in a dedicated spectrum ("Number of symbols"); an indication of an offset of an SSB and/or a CORESET (e.g., CORESET0) for communication in a dedicated spectrum ("Offset"); or an indication of one or more of whether or not an interleaving pattern is associated with the communication in the dedicated spectrum or of a type of the interleaving pattern ("Interleaving pattern").

In the example of FIG. 8, the SSB offset may be predefined as 0 for each index value. As a result, in the example of FIG. 8, the SSB offset may be absent from the table 800. In other examples, a table may include an SSB offset for each index value. For instance, the SSB offset may be configurable for one or more of the index values. Predefining the SSB offset as 0 may reduce complexity, whereas identifying an SSB offset for each index value may improve flexibility.

The values contained in the table 800 are provided merely as examples. The table may contain any suitable values in accordance with techniques described herein. The table may not be constrained to the example values shown in FIG. 8.

As indicated above, FIG. 8 is provided as an example. Other examples may differ from what is described with respect to FIG. 8.

Providing the first indication (e.g., an indication of whether to perform or to refrain from performing the at least part of the initial access procedure) and the second indication (e.g., an indication of the one or more parameters) in the MIB may enable the UE to determine whether or not to perform an initial access procedure at an early stage of the initial access procedure. For example, the UE may determine whether or not to proceed with the initial access procedure before performing further operations associated with the initial access procedure. This early-stage determination may enable the UE to conserve battery power, processing resources, time, bandwidth, or the like. For example, if the UE is a legacy UE, the legacy UE may refrain from performing a blind search of the CSS-0 and from transmitting any PRACH transmissions associated with the dedicated spectrum. In the case of a dedicated spectrum UE, the dedicated spectrum UE may determine the minimum bandwidth of the dedicated spectrum based on the information in the MIB, thereby avoiding blind detection of different minimum bandwidths in the dedicated spectrum.

FIG. 9 illustrates an example 900 of a table that summarizes parameters carried in a PBCH payload of an SSB, in accordance with the present disclosure. At least a portion of the parameters may be included in an MIB that may be output (e.g., broadcast) by the network node via one or more REs allocated for reception of the MIB by one or more dedicated spectrum UEs. In such instances, the dedicated spectrum UEs may receive (e.g., detect) the MIB and the legacy UEs may not receive (e.g., detect) the MIB.

The MIB may include one or more parameters for communication in a dedicated spectrum for one or more dedicated spectrum UEs. For example, the MIB may include a parameter that includes an indication of the dedicated spectrum ("Number of RBs of miniBW"). A field of the parameter may be any suitable number of bits. In example 900, the field of the parameter is one bit. If the bit has a first value (e.g., 0), then the parameter may indicate to the dedicated spectrum UE that the dedicated spectrum has a communication bandwidth of less than 5 MHz (e.g., the BWP may be 5 MHz and have 20 resource blocks (RBs)). If the bit has a second value (e.g., 1), then the parameter may indicate to the dedicated spectrum UE that the dedicated spectrum has a communication bandwidth that is less than or equal to 3 MHz (e.g., the BWP may be 3 MHz and have 15 RBs). Thus, the parameter in the MIB may indicate the applicable minimum bandwidth.

In some examples, the MIB may exclude an RMSI SCS indicator, such as a one-bit subCarrierSpacingCommon field. The RMSI SCS indicator may indicate whether the SCS is 15 kHz or 30 kHz. In some examples, the dedicated spectrum may have a fixed SCS (e.g., 15 kHz). As a result, the RMSI SCS indicator may be excluded from the MIB without loss of information regarding the SCS.

As shown in FIG. 9, the MIB may also include various other parameters. In some examples, the PBCH payload may include System Frame Number (SFN) information. The SFN may include ten total bits: the six most significant bits of the SFN may be carried by the MIB, and the four least significant bits may be carried outside the MIB. In some examples, the PBCH payload may include a half-frame indicator. The half-frame indicator may include one bit that is carried outside the MIB by the PBCH payload, with an additional bit carried in demodulation reference signal (DMRS) scrambling. In some examples, the PBCH payload may have an option to carry an SSB index field. However, for sub-6 GHz frequencies, as in example 900, the SSB index is zero bits. In some examples, the PBCH payload may include a $k_{SSB}$ field and an RMSI configuration field. In some examples, the PBCH payload may include front-loaded DMRS information. The front-loaded DMRS information may be one bit that is carried in the dmrs-TypeA-Position field, in the MIB, in a second or third OFDM symbol in a slot. In some examples, the PBCH payload may include a one-bit cell barring information flag (e.g., cellBarred field) and a one-bit cell reselection information flag (e.g., intraFreqReselection field), both carried in the MIB. In some examples, the PBCH payload may include four reserved bits, with two of the reserved bits carried in the MIB and two of the reserved bits carried outside the MIB. In some examples, such as a DCI transmission, the PBCH payload may have twenty-four cyclic redundancy check bits appended thereto.

Because the MIB may be output (e.g., broadcast) by the network node via one or more REs allocated for reception of the MIB by one or more dedicated spectrum UEs, the dedicated spectrum UEs may receive the MIB and the legacy UEs may not receive the MIB. As a result, the dedicated spectrum UEs may proceed with at least part of the initial access procedure efficiently (e.g., based on the "Number of RBs of miniBW" parameter in the MIB), and the legacy UEs may avoid the initial access procedure entirely.

As noted, the MIB may be output (e.g., broadcast) by the network node via one or more REs (e.g., one or more REs of the PBCH) allocated for reception of the MIB by one or more dedicated spectrum UEs. In some examples, a dedicated spectrum UE may be configured to receive the MIB based on one or more synchronization rasters associated with the one or more REs (e.g., one or more REs in the dedicated spectrum). For instance, the synchronization raster may indicate to a dedicated spectrum UE to search the one or more REs for the MIB.

In some examples, a first synchronization raster may prompt a dedicated spectrum UE to search for a MIB associated with the dedicated spectrum having a communication bandwidth of 3 MHz or less, and a second synchronization raster may prompt a UE (e.g., a dedicated UE or a legacy UE) to search for a MIB associated with a spectrum having a communication bandwidth of greater than 3 MHz. For instance, the first synchronization raster may be associated with a MIB in a predefined puncturing pattern for the PBCH with a predefined relative location to the PSS and/or SSS within the 3 MHz communication bandwidth, and the second synchronization raster may be used for both dedicated spectrum UEs supporting a restricted bandwidth or transmission (e.g., 20 RBs) within a 5 MHz communication bandwidth and for legacy UEs (e.g., UEs that use legacy 24 RBs within a 5 MHz channel bandwidth).

In some examples, a first synchronization raster may prompt a dedicated spectrum UE to search for a MIB associated with the dedicated spectrum having a communication bandwidth of 3 MHz or less (e.g., for dedicated spectrum UEs supporting a restricted transmission (e.g., 20 RBs) within a 5 MHz communication bandwidth), a second synchronization raster may prompt a dedicated spectrum UE to search for a MIB associated with a dedicated spectrum having a communication bandwidth of greater than 3 MHz, and a third synchronization raster may prompt a legacy UE to search for a MIB associated with a non-dedicated spectrum (e.g., for legacy UEs supporting 24 RBs within a 5 MHz channel bandwidth).

Because the UE may search the PSS/SSS in the SSB according to the predefined synchronization rasters before completing the initial access procedure, the UE may proceed, or refrain from proceeding, with the initial access procedure (e.g., depending on whether the UE is a dedicated spectrum UE supporting a dedicated spectrum channel bandwidth or a legacy UE). As a result, a dedicated spectrum UE may proceed with at least part of the initial access procedure efficiently based on a synchronization raster. Additionally, a legacy UE may avoid the initial access procedure entirely based on a synchronization raster.

As indicated above, FIG. 9 is provided as an example. Other examples may differ from what is described with respect to FIG. 9.

After a network node has granted initial access to a UE, the UE may perform a cell reselection procedure. In some examples, a network node may output, and a UE may receive, a neighbor cell list that indicates at least one neighboring network cell that is configured to communicate in the dedicated spectrum. For example, the UE may receive the neighbor cell list in one or more SIB transmissions. The neighbor cell list may include one or more of a list of intra-frequency neighbor cells configured to communicate in the dedicated spectrum or a list of inter-frequency neighbor cells configured to communicate in the dedicated spectrum. Listing the neighbor cells configured to communicate in the dedicated spectrum may enable dedicated spectrum UEs to identify and select the neighboring cells during cell reselection and thereby retain the capability to communicate over the dedicated spectrum after performing a cell reselection procedure.

In some examples, the network node may output, and the UE may receive, an indication of an initial search frequency associated with the at least one neighboring network cell. For instance, the initial search frequency may be a frequency where the UE may obtain the SSB of the neighboring cell. The indication of the initial search frequency may be carried in a dl-CarrierFreq field of a SIB4 transmission. For example, the dl-CarrierFreq field may include an SSB Global Synchronization Channel Number (GSCN) value for dedicated spectrum UEs that is not detected or recognized by legacy UEs.

For example, consider an example scenario in which a dedicated spectrum has been dedicated for railways. A railway may deploy a time division duplex (TDD) frequency band that is not part of the dedicated spectrum and a low-band frequency division duplex (FDD) frequency band (e.g., less than 5 MHz) that is part of the dedicated spectrum. In the TDD frequency band, the neighbor cell list for dedicated spectrum UEs may include indications of cells configured to communicate in the low-band FDD frequency band. For example, the indications may be carried as SSB GSCN values in the dl-CarrierFreq field of an SIB4 transmission. Any legacy UEs that receive the neighbor cell list may not detect or recognize the SSB GSCN value corresponding to the low-band FDD frequency band.

Because the SSB GSCN value may not be detected or recognized by legacy UEs, the legacy UEs may forgo performing blind searching in initial search frequencies for the listed neighboring cells configured for the dedicated spectrum. As a result, the legacy UEs may conserve time, battery, bandwidth, and other resources. The SSB GSCN value may also alert the dedicated spectrum UEs to neighboring cells configured to communicate over the dedicated spectrum. The signaling described above, for cell reselection, can be applied for any one or more of the aspects described herein with regard to FIGS. 5-9.

Figure 10:
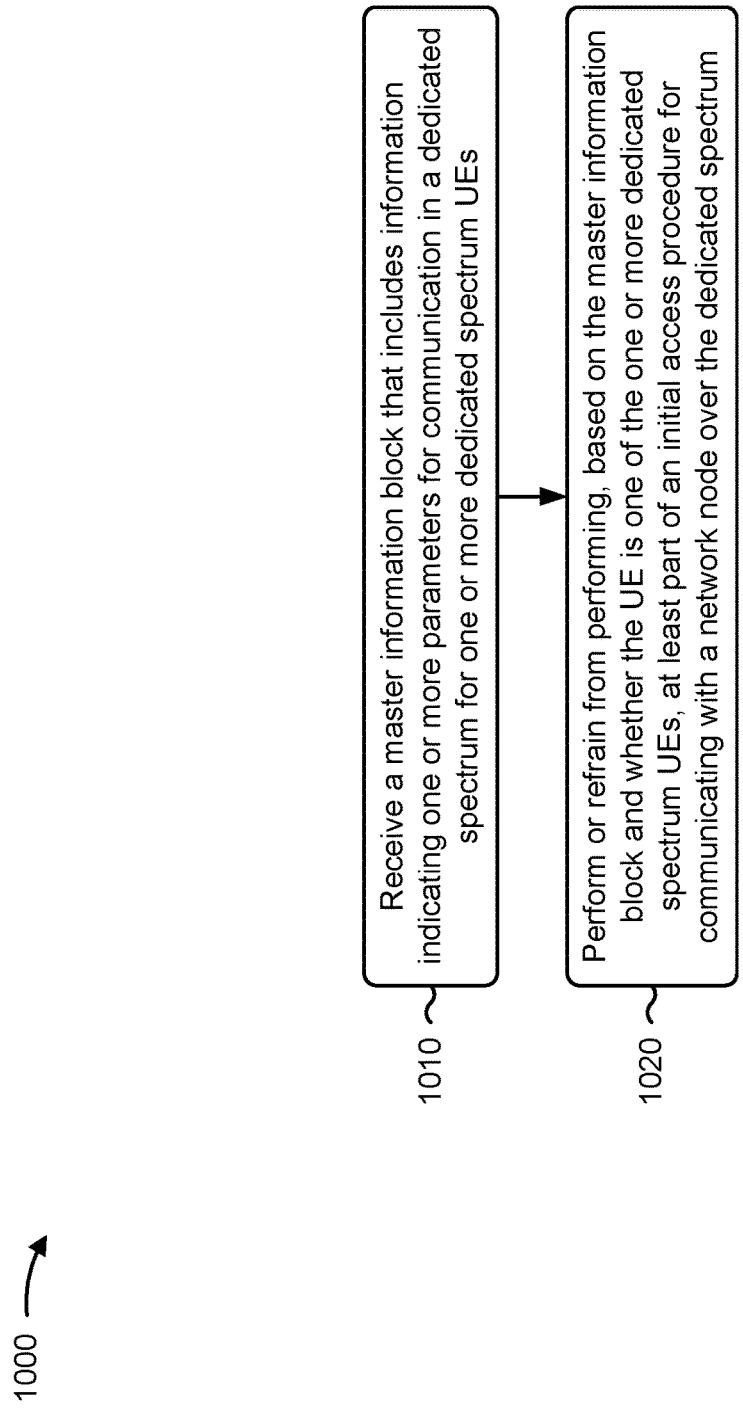
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with access to a dedicated spectrum.

As shown in FIG. 10, in some aspects, process 1000 may include receiving a master information block that includes information indicating one or more parameters for communication in a dedicated spectrum for one or more dedicated spectrum UEs (block 1010). For example, the UE (e.g., using reception component 1202 and/or communication manager 1206, depicted in FIG. 12) may receive a master information block that includes information indicating one or more parameters for communication in a dedicated spectrum for one or more dedicated spectrum UEs, as described above.

As further shown in FIG. 10, in some aspects, process 1000 may include performing or refraining from performing, based on the master information block and whether the UE is one of the one or more dedicated spectrum UEs, at least part of an initial access procedure for communicating with a network node over the dedicated spectrum (block 1020). For example, the UE (e.g., using communication manager 1206, depicted in FIG. 12) may perform or refrain from performing, based on the master information block and whether the UE is one of the one or more dedicated spectrum UEs, at least part of an initial access procedure for communicating with a network node over the dedicated spectrum, as described above.

Process 1000 may include additional aspects, such as any single aspect or any combination of aspects described below and/or in connection with one or more other processes described elsewhere herein.

In a first aspect, the UE is not one of the one or more dedicated spectrum UEs (e.g., the UE may be a legacy UE), and process 1000 further comprises refraining from performing the at least part of the initial access procedure.

In a second aspect, alone or in combination with the first aspect, the UE is one of the one or more dedicated spectrum UEs, and process 1000 further comprises performing the at least part of the initial access procedure.

In a third aspect, alone or in combination with one or more of the first and second aspects, the information includes a first indication and a second indication, wherein the first indication indicates whether to perform or to refrain from performing the at least part of the initial access procedure, and wherein the second indication indicates the one or more parameters.

In a fourth aspect, alone or in combination with one or more of the first through third aspects, the first indication is a first value and the second indication is a second value, wherein the first value is of a synchronization signal block subcarrier offset field of the master information block, and wherein the second value is of a remaining minimum system information configuration field of the master information block.

In a fifth aspect, alone or in combination with one or more of the first through fourth aspects, process 1000 includes identifying the first value and the second value, and performing, in response to identifying the first value, a look-up for the one or more parameters in a table, wherein the table indexes values of the one or more parameters based on the second value.

In a sixth aspect, alone or in combination with one or more of the first through fifth aspects, the first value indicates that the one or more parameters are to be identified by reference to a table, wherein the table indexes values of the one or more parameters based on the second value.

In a seventh aspect, alone or in combination with one or more of the first through sixth aspects, the first indication is a first value and the second indication is a second value, wherein the first value is of a remaining minimum system information configuration field of the master information block, and wherein the second value is of a synchronization signal block subcarrier offset field of the master information block.

In an eighth aspect, alone or in combination with one or more of the first through seventh aspects, process 1000 includes identifying the first value and the second value, and performing, in response to identifying the first value, a look-up for the one or more parameters in a table, wherein the table indexes values of the one or more parameters based on the second value.

In a ninth aspect, alone or in combination with one or more of the first through eighth aspects, the first value indicates that the one or more parameters are to be identified by reference to a table, wherein the table indexes values of the one or more parameters based on the second value.

In a tenth aspect, alone or in combination with one or more of the first through ninth aspects, the information includes a first value and a second value, wherein the first value indicates that the one or more parameters are to be identified by reference to a table, wherein the table indexes values of the one or more parameters based on the second value, and wherein the one or more parameters include an indication of an offset from a lowest subcarrier of a common resource block to a lowest subcarrier of a synchronization signal block associated with the master information block.

In an eleventh aspect, alone or in combination with one or more of the first through tenth aspects, the UE is one of the one or more dedicated spectrum UEs, and receiving the master information block comprises receiving the master information block via one or more resource elements allocated for reception of the master information block by the one or more dedicated spectrum UEs.

In a twelfth aspect, alone or in combination with one or more of the first through eleventh aspects, the master information block includes the one or more parameters, and the one or more parameters include an indication of the dedicated spectrum.

In a thirteenth aspect, alone or in combination with one or more of the first through twelfth aspects, a communication bandwidth of the dedicated spectrum is less than 5 MHz.

In a fourteenth aspect, alone or in combination with one or more of the first through thirteenth aspects, the communication bandwidth is less than or equal to 3 MHz.

In a fifteenth aspect, alone or in combination with one or more of the first through fourteenth aspects, process 1000 includes receiving, from the network node, a neighbor cell list that indicates at least one neighboring network cell that is configured to communicate in the dedicated spectrum.

In a sixteenth aspect, alone or in combination with one or more of the first through fifteenth aspects, process 1000 includes receiving, from the network node, an indication of an initial search frequency associated with the at least one neighboring network cell.

In a seventeenth aspect, alone or in combination with one or more of the first through sixteenth aspects, the one or more parameters comprise at least one of a first indication, wherein the first indication is of a multiplexing pattern for the communication in the dedicated spectrum, a second indication, wherein the second indication is of a quantity of resource blocks for the communication in the dedicated spectrum, a third indication, wherein the third indication is of a quantity of symbols for the communication in the dedicated spectrum, a fourth indication, wherein the fourth indication is of an offset of a control resource set for the communication in the dedicated spectrum, a fifth indication, wherein the fifth indication is of one or more of whether or not an interleaving pattern is associated with the communication in the dedicated spectrum or of a type of the interleaving pattern, or a combination thereof.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
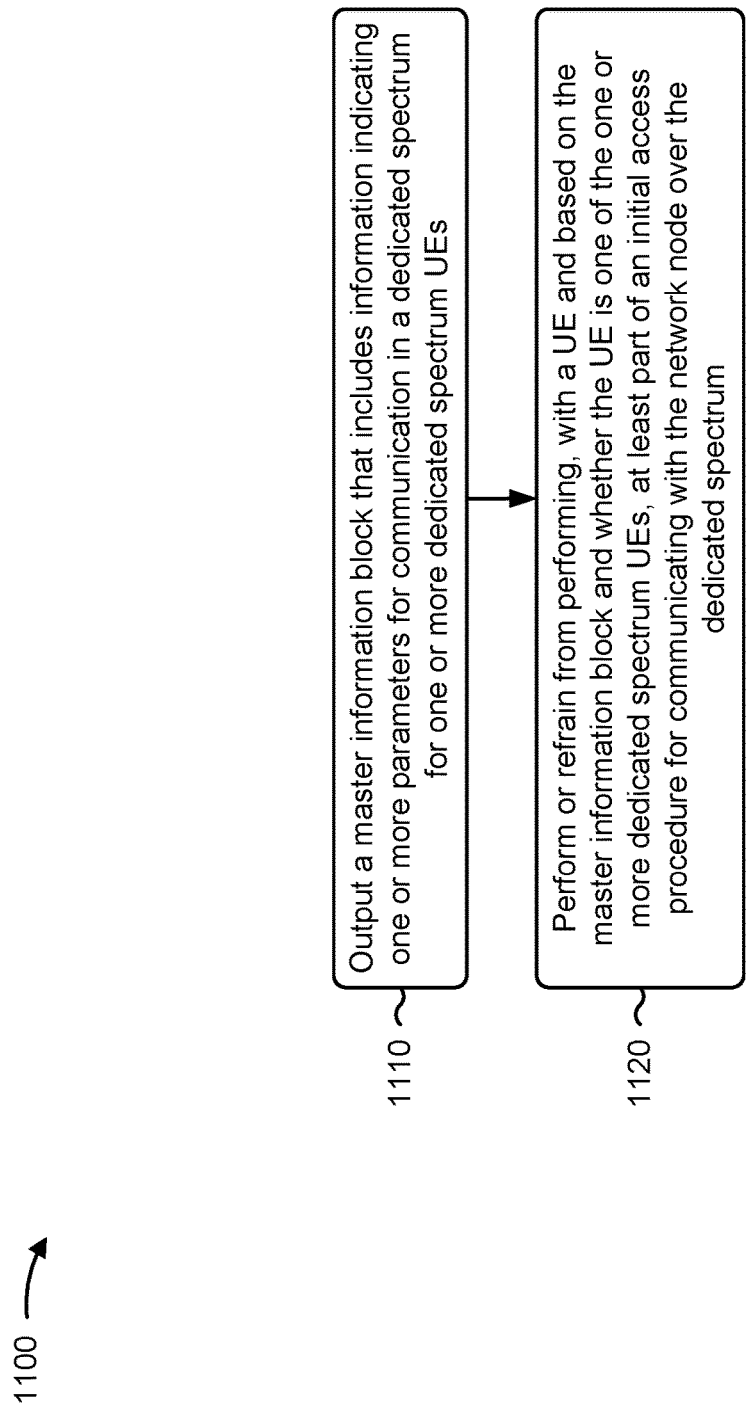
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with access to a dedicated spectrum.

As shown in FIG. 11, in some aspects, process 1100 may include outputting a master information block that includes information indicating one or more parameters for communication in a dedicated spectrum for one or more dedicated spectrum UEs (block 1110). For example, the network node (e.g., using transmission component 1304 and/or communication manager 1306, depicted in FIG. 13) may output a master information block that includes information indicating one or more parameters for communication in a dedicated spectrum for one or more dedicated spectrum UEs, as described above.

As further shown in FIG. 11, in some aspects, process 1100 may include performing or refraining from performing, with a UE and based on the master information block and whether the UE is one of the one or more dedicated spectrum UEs, at least part of an initial access procedure for communicating with the network node over the dedicated spectrum (block 1120). For example, the network node (e.g., using communication manager 1306, depicted in FIG. 13) may perform or refrain from performing, with a UE and based on the master information block and whether the UE is one of the one or more dedicated spectrum UEs, at least part of an initial access procedure for communicating with the network node over the dedicated spectrum, as described above.

Process 1100 may include additional aspects, such as any single aspect or any combination of aspects described below and/or in connection with one or more other processes described elsewhere herein.

In a first aspect, the UE is one of the one or more dedicated spectrum UEs, and process 1100 further comprises performing the at least part of the initial access procedure.

In a second aspect, alone or in combination with the first aspect, the information includes a first indication and a second indication, wherein the first indication indicates whether to perform or to refrain from performing the at least part of the initial access procedure, and wherein the second indication indicates the one or more parameters.

In a third aspect, alone or in combination with one or more of the first and second aspects, the first indication is a first value and the second indication is a second value, wherein the first value is of a synchronization signal block subcarrier offset field of the master information block, and wherein the second value is of a remaining minimum system information configuration field of the master information block.

In a fourth aspect, alone or in combination with one or more of the first through third aspects, the first indication is a first value and the second indication is a second value, wherein the first value is of a remaining minimum system information configuration field of the master information block, and wherein the second value is of a synchronization signal block subcarrier offset field of the master information block.

In a fifth aspect, alone or in combination with one or more of the first through fourth aspects, the UE is one of the one or more dedicated spectrum UEs, and outputting the master information block comprises outputting the master information block via one or more resource elements allocated for reception of the master information block by the one or more dedicated spectrum UEs.

In a sixth aspect, alone or in combination with one or more of the first through fifth aspects, the master information block includes the one or more parameters, and the one or more parameters include an indication of the dedicated spectrum.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
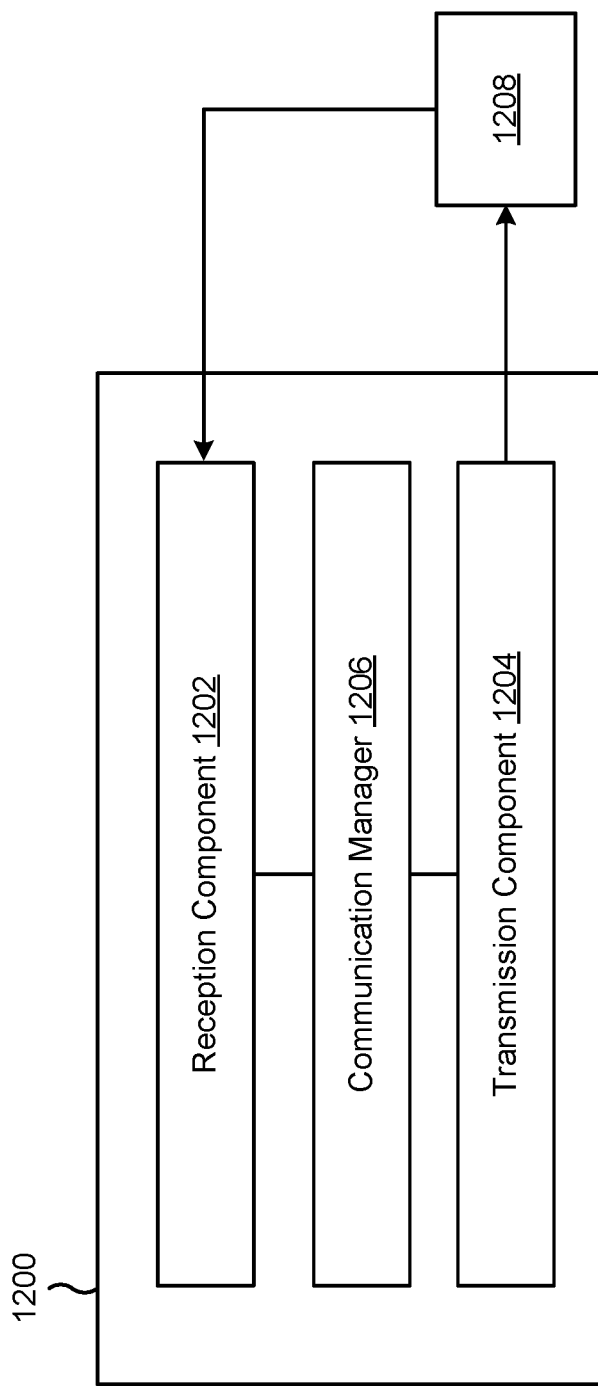
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIG. 4-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive a master information block that includes information indicating one or more parameters for communication in a dedicated spectrum for one or more dedicated spectrum UEs. The communication manager 1206 may perform or refrain from performing, based on the master information block and whether the UE is one of the one or more dedicated spectrum UEs, at least part of an initial access procedure for communicating with a network node over the dedicated spectrum.

The communication manager 1206 may identify the first value and the second value.

The communication manager 1206 may perform, in response to identifying the first value, a look-up for the one or more parameters in a table, wherein the table indexes values of the one or more parameters based on the second value.

The communication manager 1206 may perform, in response to identifying the first value, a look-up for the one or more parameters in a table, wherein the table indexes values of the one or more parameters based on the second value.

The reception component 1202 may receive, from the network node, a neighbor cell list that indicates at least one neighboring network cell that is configured to communicate in the dedicated spectrum.

The reception component 1202 may receive, from the network node, an indication of an initial search frequency associated with the at least one neighboring network cell.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
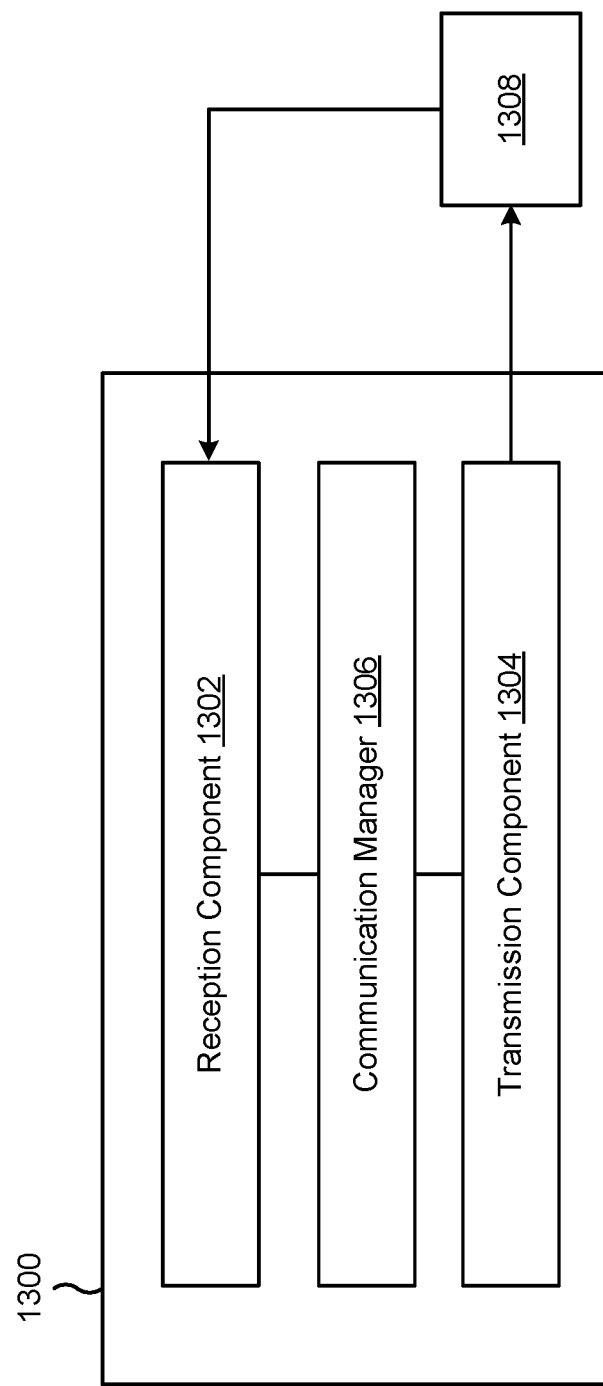
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIG. 4-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may output a master information block that includes information indicating one or more parameters for communication in a dedicated spectrum for one or more dedicated spectrum UEs. The communication manager 1306 may perform or refrain from performing, with a UE and based on the master information block and whether the UE is one of the one or more dedicated spectrum UEs, at least part of an initial access procedure for communicating with the network node over the dedicated spectrum.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving a master information block that includes information indicating one or more parameters for communication in a dedicated spectrum for one or more dedicated spectrum UEs; and performing or refraining from performing, based on the master information block and whether the UE is one of the one or more dedicated spectrum UEs, at least part of an initial access procedure for communicating with a network node over the dedicated spectrum.

Aspect 2: The method of Aspect 1, wherein the UE is not one of the one or more dedicated spectrum UEs, the method further comprising: refraining from performing the at least part of the initial access procedure.

Aspect 3: The method of Aspect 1, wherein the UE is one of the one or more dedicated spectrum UEs, the method further comprising: performing the at least part of the initial access procedure.

Aspect 4: The method of any of Aspects 1-3, wherein the information includes a first indication and a second indication, wherein the first indication indicates whether to perform or to refrain from performing the at least part of the initial access procedure, and wherein the second indication indicates the one or more parameters.

Aspect 5: The method of Aspect 4, wherein the first indication is a first value and the second indication is a second value, wherein the first value is of a synchronization signal block subcarrier offset field of the master information block, and wherein the second value is of a remaining minimum system information configuration field of the master information block.

Aspect 6: The method of Aspect 5, further comprising: identifying the first value and the second value; and performing, in response to identifying the first value, a look-up for the one or more parameters in a table, wherein the table indexes values of the one or more parameters based on the second value.

Aspect 7: The method of Aspect 5, wherein the first value indicates that the one or more parameters are to be identified by reference to a table, wherein the table indexes values of the one or more parameters based on the second value.

Aspect 8: The method of Aspect 4, wherein the first indication is a first value and the second indication is a second value, wherein the first value is of a remaining minimum system information configuration field of the master information block, and wherein the second value is of a synchronization signal block subcarrier offset field of the master information block.

Aspect 9: The method of Aspect 8, further comprising: identifying the first value and the second value; and performing, in response to identifying the first value, a look-up for the one or more parameters in a table, wherein the table indexes values of the one or more parameters based on the second value.

Aspect 10: The method of Aspect 8, wherein the first value indicates that the one or more parameters are to be identified by reference to a table, wherein the table indexes values of the one or more parameters based on the second value.

Aspect 11: The method of any of Aspects 1-10, wherein the information includes a first value and a second value, wherein the first value indicates that the one or more parameters are to be identified by reference to a table, wherein the table indexes values of the one or more parameters based on the second value, wherein the one or more parameters include an indication of an offset from a lowest subcarrier of a common resource block to a lowest subcarrier of a synchronization signal block associated with the master information block.

Aspect 12: The method of any of Aspects 1-11, wherein the UE is one of the one or more dedicated spectrum UEs, and wherein receiving the master information block comprises: receiving the master information block via one or more resource elements allocated for reception of the master information block by the one or more dedicated spectrum UEs.

Aspect 13: The method of Aspect 12, wherein the master information block includes the one or more parameters, and wherein the one or more parameters include an indication of the dedicated spectrum.

Aspect 14: The method of Aspect 12, wherein receiving the master information block via the one or more resource elements comprises: receiving the master information block based on one or more synchronization rasters associated with the one or more resource elements.

Aspect 15: The method of any of Aspects 1-14, wherein a communication bandwidth of the dedicated spectrum is less than 5 MHz.

Aspect 16: The method of Aspect 15, wherein the communication bandwidth is less than or equal to 3 MHz.

Aspect 17: The method of any of Aspects 1-16, further comprising: receiving, from the network node, a neighbor cell list that indicates at least one neighboring network cell that is configured to communicate in the dedicated spectrum.

Aspect 18: The method of Aspect 17, further comprising: receiving, from the network node, an indication of an initial search frequency associated with the at least one neighboring network cell.

Aspect 19: The method of any of Aspects 1-18, wherein the one or more parameters comprise at least one of: a first indication, wherein the first indication is of a multiplexing pattern for the communication in the dedicated spectrum, a second indication, wherein the second indication is of a quantity of resource blocks for the communication in the dedicated spectrum, a third indication, wherein the third indication is of a quantity of symbols for the communication in the dedicated spectrum, a fourth indication, wherein the fourth indication is of an offset of a control resource set for the communication in the dedicated spectrum, a fifth indication, wherein the fifth indication is of one or more of whether or not an interleaving pattern is associated with the communication in the dedicated spectrum or of a type of the interleaving pattern, or a combination thereof.

Aspect 20: A method of wireless communication performed by a network node, comprising: outputting a master information block that includes information indicating one or more parameters for communication in a dedicated spectrum for one or more dedicated spectrum UEs; and performing or refraining from performing, with a UE and based on the master information block and whether the UE is one of the one or more dedicated spectrum UEs, at least part of an initial access procedure for communicating with the network node over the dedicated spectrum.

Aspect 21: The method of Aspect 20, wherein the UE is one of the one or more dedicated spectrum UEs, the method further comprising: performing the at least part of the initial access procedure.

Aspect 22: The method of any of Aspects 20-21, wherein the information includes a first indication and a second indication, wherein the first indication indicates whether to perform or to refrain from performing the at least part of the initial access procedure, and wherein the second indication indicates the one or more parameters.

Aspect 23: The method of Aspect 22, wherein the first indication is a first value and the second indication is a second value, wherein the first value is of a synchronization signal block subcarrier offset field of the master information block, and wherein the second value is of a remaining minimum system information configuration field of the master information block.

Aspect 24: The method of Aspect 23, wherein the first indication is a first value and the second indication is a second value, wherein the first value is of a remaining minimum system information configuration field of the master information block, and wherein the second value is of a synchronization signal block subcarrier offset field of the master information block.

Aspect 25: The method of any of Aspects 20-24, wherein the UE is one of the one or more dedicated spectrum UEs, and wherein outputting the master information block comprises: outputting the master information block via one or more resource elements allocated for reception of the master information block by the one or more dedicated spectrum UEs.

Aspect 26: The method of Aspect 25, wherein the master information block includes the one or more parameters, and wherein the one or more parameters include an indication of the dedicated spectrum.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of")

What is claimed is:

1. A user equipment (UE) for wireless communication, comprising:
a memory; and
one or more processors, coupled to the memory, configured to:
receive a master information block that includes information indicating one or more parameters for communication in a dedicated spectrum for one or more dedicated spectrum UEs;
receive a neighbor cell list that indicates at least one neighboring network cell that is configured to communicate in the dedicated spectrum; and
perform or refrain from performing, based on the master information block and whether the UE is one of the one or more dedicated spectrum UEs, at least part of an initial access procedure for communicating with a network node over the dedicated spectrum.

2. The UE of claim 1,
wherein the UE is not one of the one or more dedicated spectrum UEs, and the one or more processors, to perform or refrain from performing the at least part of the initial access procedure, are configured to:
refrain from performing the at least part of the initial access procedure.

3. The UE of claim 1,
wherein the UE is one of the one or more dedicated spectrum UEs, wherein the one or more processors, to perform or refrain from performing the at least part of the initial access procedure, are configured to:
perform the at least part of the initial access procedure.

4. The UE of claim 1,
wherein the information includes a first indication and a second indication, wherein the first indication indicates whether to perform or to refrain from performing the at least part of the initial access procedure, and wherein the second indication indicates the one or more parameters.

5. The UE of claim 4,
wherein the first indication is a first value and the second indication is a second value, wherein the first value is of a synchronization signal block subcarrier offset field of the master information block, and wherein the second value is of a remaining minimum system information configuration field of the master information block.

6. The UE of claim 5,
wherein the one or more processors are further configured to:
identify the first value and the second value; and
perform, in response to identifying the first value, a look-up for the one or more parameters in a table, wherein the table indexes values of the one or more parameters based on the second value.

7. The UE of claim 5,
wherein the first value indicates that the one or more parameters are to be identified by reference to a table, wherein the table indexes values of the one or more parameters based on the second value.

8. The UE of claim 4,
wherein the first indication is a first value and the second indication is a second value, wherein the first value is of a remaining minimum system information configuration field of the master information block, and wherein the second value is of a synchronization signal block subcarrier offset field of the master information block.

9. The UE of claim 8,
wherein the one or more processors are further configured to:
identify the first value and the second value; and
perform, in response to identifying the first value, a look-up for the one or more parameters in a table, wherein the table indexes values of the one or more parameters based on the second value.

10. The UE of claim 8,
wherein the first value indicates that the one or more parameters are to be identified by reference to a table, wherein the table indexes values of the one or more parameters based on the second value.

11. The UE of claim 1,
wherein the information includes a first value and a second value, wherein the first value indicates that the one or more parameters are to be identified by reference to a table, wherein the table indexes values of the one or more parameters based on the second value, wherein the one or more parameters include an indication of an offset from a lowest subcarrier of a common resource block to a lowest subcarrier of a synchronization signal block associated with the master information block.

12. The UE of claim 1,
wherein the UE is one of the one or more dedicated spectrum UEs, and wherein the one or more processors, to receive the master information block, are configured to:
receive the master information block via one or more resource elements allocated for reception of the master information block by the one or more dedicated spectrum UEs.

13. The UE of claim 12,
wherein the master information block includes the one or more parameters, and wherein the one or more parameters include an indication of the dedicated spectrum.

14. The UE of claim 12,
wherein the one or more processors, to receive the master information block via the one or more resource elements, are configured to:
receive the master information block based on one or more synchronization rasters associated with the one or more resource elements.

15. The UE of claim 1,
wherein a communication bandwidth of the dedicated spectrum is less than 5 MHz.

16. The UE of claim 15,
wherein the communication bandwidth is less than or equal to 3 MHz.

17. The UE of claim 1,
wherein the one or more processors are further configured to:
receive, from the network node, an indication of an initial search frequency associated with the at least one neighboring network cell.

18. The UE of claim 1,
wherein the one or more parameters comprise at least one of:
a first indication, wherein the first indication is of a multiplexing pattern for the communication in the dedicated spectrum, a second indication, wherein the second indication is of a quantity of resource blocks for the communication in the dedicated spectrum, a third indication, wherein the third indication is of a quantity of symbols for the communication in the dedicated spectrum, a fourth indication, wherein the fourth indication is of an offset of a control resource set for the communication in the dedicated spectrum, a fifth indication, wherein the fifth indication is of one or more of whether or not an interleaving pattern is associated with the communication in the dedicated spectrum or of a type of the interleaving pattern, or a combination thereof.

19. A network node for wireless communication, comprising:

a memory; and one or more processors, coupled to the memory, configured to:

output a master information block that includes information indicating one or more parameters for communication in a dedicated spectrum for one or more dedicated spectrum user equipments (UEs);

output a neighbor cell list that indicates at least one neighboring network cell that is configured to communicate in the dedicated spectrum; and perform or refrain from performing, with a UE and based on the master information block and whether the UE is one of the one or more dedicated spectrum UEs, at least part of an initial access procedure for communicating with the network node over the dedicated spectrum.

20. The network node of claim 19, wherein the UE is one of the one or more dedicated spectrum UEs, and wherein the one or more processors, to perform or refrain from performing the at least part of the initial access procedure, are configured to:

perform the at least part of the initial access procedure.

21. The network node of claim 19, wherein the information includes a first indication and a second indication, wherein the first indication indicates whether to perform or to refrain from performing the at least part of the initial access procedure, and wherein the second indication indicates the one or more parameters.

22. The network node of claim 21, wherein the first indication is a first value and the second indication is a second value, wherein the first value is of a synchronization signal block subcarrier offset field of the master information block, and wherein the second value is of a remaining minimum system information configuration field of the master information block.

23. The network node of claim 21, wherein the first indication is a first value and the second indication is a second value, wherein the first value is of a remaining minimum system information configuration field of the master information block, and wherein the second value is of a synchronization signal block subcarrier offset field of the master information block.

24. The network node of claim 19, wherein the UE is one of the one or more dedicated spectrum UEs, and wherein the one or more processors, to output the master information block, are configured to:

output the master information block via one or more resource elements allocated for reception of the master information block by the one or more dedicated spectrum UEs.

25. The network node of claim 24, wherein the master information block includes the one or more parameters, and wherein the one or more parameters include an indication of the dedicated spectrum.

26. A method of wireless communication performed by a user equipment (UE), comprising:

receiving a master information block that includes information indicating one or more parameters for communication in a dedicated spectrum for one or more dedicated spectrum UEs;

receiving a neighbor cell list that indicates at least one neighboring network cell that is configured to communicate in the dedicated spectrum; and performing or refraining from performing, based on the master information block and whether the UE is one of the one or more dedicated spectrum UEs, at least part of an initial access procedure for communicating with a network node over the dedicated spectrum.

27. The method of claim 26, wherein the information includes a first indication and a second indication, wherein the first indication indicates whether to perform or to refrain from performing the at least part of the initial access procedure, and wherein the second indication indicates the one or more parameters.

28. A method of wireless communication performed by a network node, comprising:

outputting a master information block that includes information indicating one or more parameters for communication in a dedicated spectrum for one or more dedicated spectrum user equipments (UEs);

outputting a neighbor cell list that indicates at least one neighboring network cell that is configured to communicate in the dedicated spectrum; and performing or refraining from performing, with a UE and based on the master information block and whether the UE is one of the one or more dedicated spectrum UEs, at least part of an initial access procedure for communicating with the network node over the dedicated spectrum.

29. The method of claim 28, wherein the information includes a first indication and a second indication, wherein the first indication indicates whether to perform or to refrain from performing the at least part of the initial access procedure, and wherein the second indication indicates the one or more parameters.

30. The method of claim 26, further comprising:

receiving an indication of an initial search frequency associated with the at least one neighboring network cell.

* * * * *